(12) United States Patent
Susanto et al.

(10) Patent No.: US 9,298,790 B2
(45) Date of Patent: Mar. 29, 2016

(54) REPLICATION OF ASSETS ACROSS DATA CENTERS

(71) Applicant: Microsoft Corporation, Redmond, WA (US)

(72) Inventors: Ferry Susanto, Bellevue, WA (US); Usman Ghani, Redmond, WA (US); Koushik Rajaram, Bothell, WA (US); Pavel Dournov, Sammamish, WA (US); Eron D. Wright, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 146 days.

(21) Appl. No.: 13/745,557

(22) Filed: Jan. 18, 2013

(65) Prior Publication Data

US 2014/0207736 A1    Jul. 24, 2014

(51) Int. Cl.
G06F 17/30 (2006.01)
H04L 29/08 (2006.01)

(52) U.S. Cl.
CPC .... G06F 17/30575 (2013.01); G06F 17/30578 (2013.01); G06F 17/30581 (2013.01); H04L 67/1095 (2013.01)

(58) Field of Classification Search
CPC .............. G06F 3/065; G06F 17/30575; G06F 17/30578; G06F 17/30581; H04L 67/1095
See application file for complete search history.

(56) References Cited

U.S. PATENT DOCUMENTS

| 7,065,538 | B2 | 6/2006 | Aronoff et al. |
| 7,555,674 | B1 * | 6/2009 | Wang ................. G06F 11/1662 714/12 |
| 7,725,763 | B2 * | 5/2010 | Vertes et al. ................. 714/6.12 |
| 7,756,842 | B2 | 7/2010 | Blumenau et al. |
| 8,135,930 | B1 | 3/2012 | Mattox et al. |
| 8,190,588 | B1 * | 5/2012 | Gupta ................. G06F 11/1662 707/615 |
| 2008/0198752 | A1 * | 8/2008 | Fan et al. ...................... 370/238 |
| 2011/0320710 | A1 * | 12/2011 | Usami .......................... 711/114 |
| 2012/0192175 | A1 | 7/2012 | Dorai et al. |
| 2014/0195636 | A1 * | 7/2014 | Karve et al. ................... 709/215 |

OTHER PUBLICATIONS

Pallmann, David, "Reintroducing Windows Azure, Part 3: Virtual Machines", Published on: Jun. 11, 2012, Available at: http://davidpallmann.blogspot.in/2012/06/reintroducing-windows-azure-part-3.html.

Al-Kiswany, et al., "VMFlock: Virtual Machine Co-Migration for the Cloud", In Proceedings of 20th International Symposium on High Performance Distributed Computing, Jun. 8, 2011, 13 pages.

(Continued)

*Primary Examiner* — Bruce Moser
(74) *Attorney, Agent, or Firm* — Ben Tabor; Doug Barker; Micky Minhas

(57) ABSTRACT

The replication of an asset from a source cluster in a source data center to multiple target clusters in multiple destination data centers. The replication occurs by first estimating or determining a cost parameter associated with copying of the asset from the source cluster to each of at least some of the target clusters. As an example, the cost parameter might be a geographical parameter, but might also be any cost parameter such as a channel bandwidth, channel cost, utilization ratio or the like. Based on the cost parameters, an order of replication priority is determined. Then, the replication is initiated in accordance with the prioritization. The replication may occur in multiple phases, and replication prioritization may occur on a per phase basis.

18 Claims, 6 Drawing Sheets

(56) References Cited

OTHER PUBLICATIONS

Jayaram, et al., "An Empirical Analysis of Similarity in Virtual Machine Images", In Proceedings of 12th International Middleware Conference, Dec. 12, 2011, 6 pages.

Reiher, et al., "Peer-to-Peer Reconciliation Based Replication for Mobile Computers", In Proceedings of Second Workshop on Mobility and Replication, Jun. 1996, 5 pages.

* cited by examiner

REPLICATION OF ASSETS ACROSS DATA CENTERS

BACKGROUND

Software, whether in the form of programs, data, or both, has become a valuable resource for individuals and enterprises. In some cases, such as for enterprises located worldwide, it is helpful to have such assets replicated so as to be available at a variety of global locations. Examples of such software assets include software applications and virtual machine images.

Often, such software assets may be present within a data center. A data center is a larger collection of servers with enormous computing and storage power. Such data centers are often multi-tenant in that the enterprise may store software resources at the data center even though the enterprise does not own or operate the data center. Such data centers may be located throughout the globe. Accordingly, in order to have more ready access to software assets, such software assets may be present on multiple data centers.

However, replicating large software assets from one data center to another does not come without cost. Bandwidth is used between the source and target data centers. Processing resources may also be used at both the source data center and the target data center.

BRIEF SUMMARY

At least one embodiment described herein relates to the replication of an asset from a source cluster in a source data center to multiple target clusters in multiple destination data centers. The replication occurs by first estimating or determining a cost parameter associated with copying of the asset from the source cluster to each of at least some of the target clusters. As an example, the cost parameter might be a geographical parameter, but might also be any cost parameter such as a channel bandwidth, channel cost, utilization ratio or the like.

Based on the cost parameters, an order of replication priority is determined. Then, the replication is initiated in accordance with the prioritization. In one embodiment, the replication occurs in multiple phases, and the prioritization is determined on a per phase basis. In some embodiments, a number of copy operations of at least some types are limited per phase so that the replication system does not overwhelm the capacity of the entire system. In some embodiments in which the cost parameter is based on geography, at least one remotely located target cluster may be prioritized for a first phase of replication.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the replication of an asset from a source cluster in a source data center to multiple target clusters in multiple destination data centers is described. The replication occurs by first estimating or determining a cost parameter associated with copying of the asset from the source cluster to each of at least some of the target clusters. As an example, the cost parameter might be a geographical parameter, but might also be any cost parameter such as a channel bandwidth, channel cost, utilization ratio or the like. Based on the cost parameters, an order of replication priority is determined. Then, the replication is initiated in accordance with the prioritization.

The replication may occur in multiple phases, and replication prioritization may occur on a per phase basis. In the case of the cost parameter being a geographically related, perhaps replication to a remotely located target cluster is prioritized for a first stage of replication. This allows that replicated asset in the remotely located target cluster to be used as a more convenient source for replication for one or more cluster located more proximate to the remotely located cluster.

Some introductory discussion of a computing system will be described with respect to FIG. 1. Then, the principles of operation of the replication will be described with respect to FIGS. 2 through 6.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
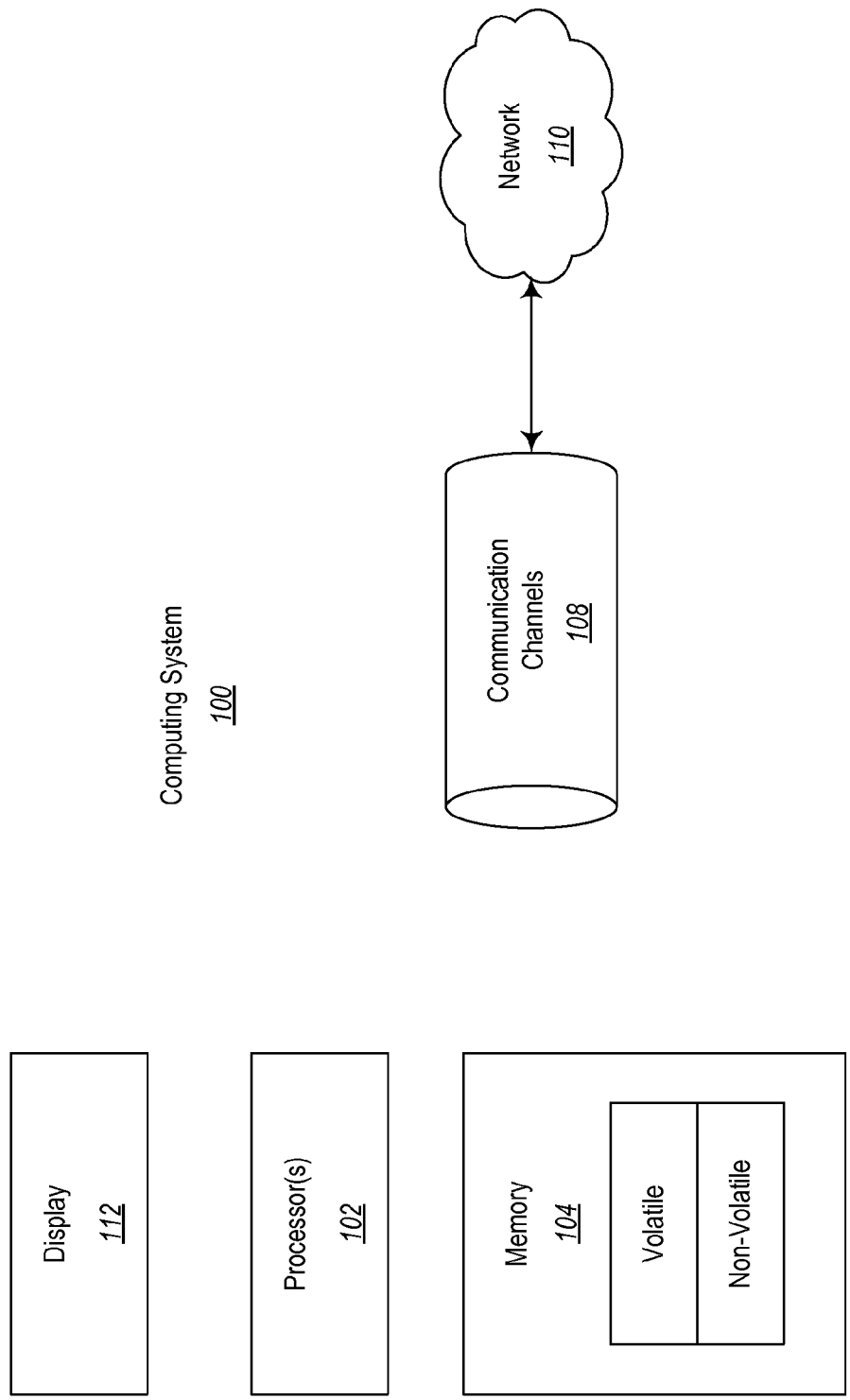
FIG. 1 abstractly illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
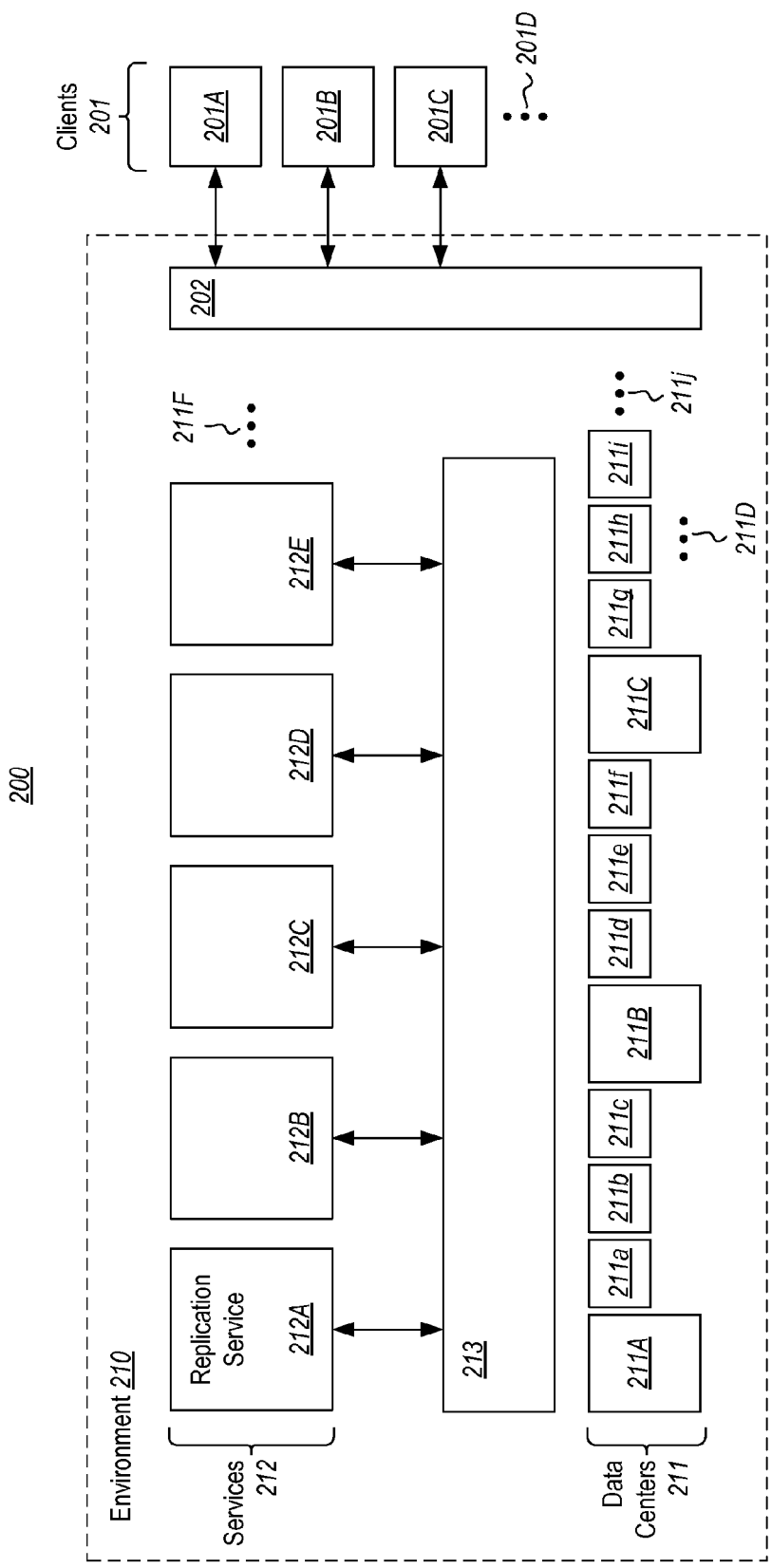
FIG. 2 abstractly illustrates an environment 200 in which multiple clients interact with a cloud computing environment using an interface.

FIG. 2 abstractly illustrates an environment 200 in which the principles described herein may be employed. The environment 200 includes multiple clients 201 interacting with a cloud computing environment 210 using an interface 202. The environment 200 is illustrated as having three clients 201A, 201B and 201C, although the ellipses 201D represent that the principles described herein are not limited to the number of clients interfacing with the cloud computing environment 210 through the interface 202. The cloud computing environment 210 may provide services to the clients 201 on-demand and thus the number of clients 201 receiving services from the cloud computing environment 210 may vary over time.

Each client 201 may, for example, be structured as described above for the computing system 100 of FIG. 1. Alternatively or in addition, the client may be an application or other software module that interfaces with the cloud computing environment 210 through the interface 202. The interface 202 may be an application program interface that is defined in such a way that any computing system or software entity that is capable of using the application program interface may communicate with the cloud computing environment 210.

Cloud computing environments may be distributed and may even be distributed internationally and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The system 210 includes multiple data centers 211, each including corresponding computing resources, such as processing, memory, storage, bandwidth, and so forth. The data centers 211 include larger origin data centers 211A, 211B and 211C, though the ellipses 211D represent that there is no restriction as to the number of origin data centers within the data center group 211. Also, the data centers 211 include smaller edge data centers 211a through 211i, although the ellipses 211j represent that there is no restriction as to the number of edge data centers within the data center group 211. Each of the data centers 211 may include perhaps a very large number of host computing systems that may be each structured as described above for the computing system 100 of FIG. 1.

The data centers 211 may be distributed geographically, and perhaps even throughout the world if the cloud computing environment 200 spans the globe. The origin data centers 211A through 211D have greater computing resources, and thus are more expensive, as compared to the edge data centers 211a through 211j. Thus, there are a smaller number of origin data centers distributed throughout the coverage of the cloud computing environment 200. The edge data centers 211 have lesser computing resource, and thus are less expensive. Thus, there is a larger number of edge data centers distributed throughout the coverage of the cloud computing environment 200. Thus, for a majority of clients 201, it is more likely that the client entity (e.g., the client machine itself or its user) is closer geographically and closer from a network perspective (in terms of latency) to an edge data center as compared to an origin data center.

The cloud computing environment 200 also includes services 212. In the illustrated example, the services 200 include five distinct services 212A, 212B, 212C, 212D and 212E, although the ellipses 211F represent that the principles described herein are not limited to the number of service in the system 210. A service coordination system 213 communicates with the data centers 211 and with the services 212 to thereby provide services requested by the clients 201, and other services (such as authentication, billing, and so forth) that may be prerequisites for the requested service.

One of the services 212 (e.g., service 212A) may be a replication service that is described in further detail below, and that operates to deploy and operating an application in the cloud computing environment in a manner that performance of the application is enhanced. That said, the principles described herein for replicating from one data center to another, and for reconciliation of replicated copies are not dependent on the replication service being with a cloud computing environment.

Figure 3:
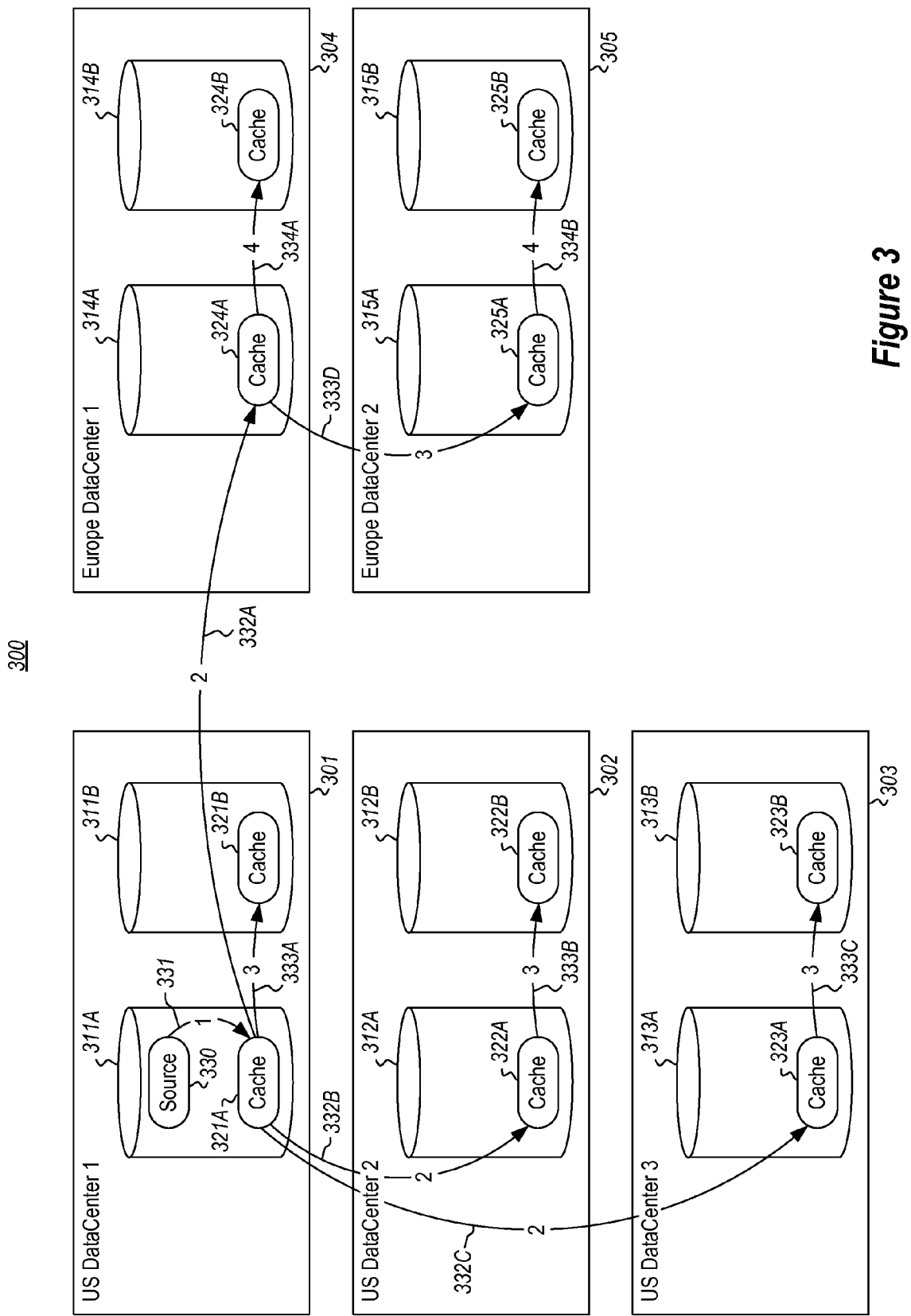
FIG. 3 illustrates an example international environment of data centers in which the replication described herein may be performed.

FIG. 3 illustrates an example environment 300 in which the replication described herein may be performed. The environment 300 is an example international system that includes five data centers 301 through 305 including a first United States data center 301, a second United States data center 302, a third United States data center 301, a first European data center 304, and a second European data center 305. However, the principles described herein are not limited to the number or locale of the data centers involved as sources or targets of the replication process described herein. The data centers 301 through 305 are examples of the data centers 211 of FIG. 2, although the principles described herein are not limited to a cloud computing environment as being the medium through which replication occurs. Replication throughout a distributed environment is helpful as it can often be more efficient to access an asset from a data center that is closer to the point of consumption.

The asset that is being replicated may be any piece of software and/or data. As examples only, the asset might be a virtual machine image. A virtual machine image may be used to spin up an initial state for a virtual machine. That virtual machine may be used to simulate the functionality of a physical computing system using the underlying resource provided by a host computing system that hosts the virtual machine. The asset might alternatively be an application package or another item of software.

In the very specific example of FIG. 3, each data center has two server clusters. However, the principles described herein are not limited to the number of server clusters that are within a given data center. In the illustrated example, data center 301 includes server clusters 311A and 311B, data center 302 includes server clusters 312A and 312B, data center 303 includes server clusters 313A and 313B, data center 304 includes server clusters 314A and 314B, and data center 305 includes server clusters 315A and 315B. In the description and in the claims, a "server cluster" is described as a group of servers managed by a single entity. A server cluster can run customer code and/or may store customer data. A server cluster may also be referred to herein as simply a "cluster". The remaining portions of FIG. 3 will be described with respect to FIG. 4 and subsequent figures.

Figure 4:
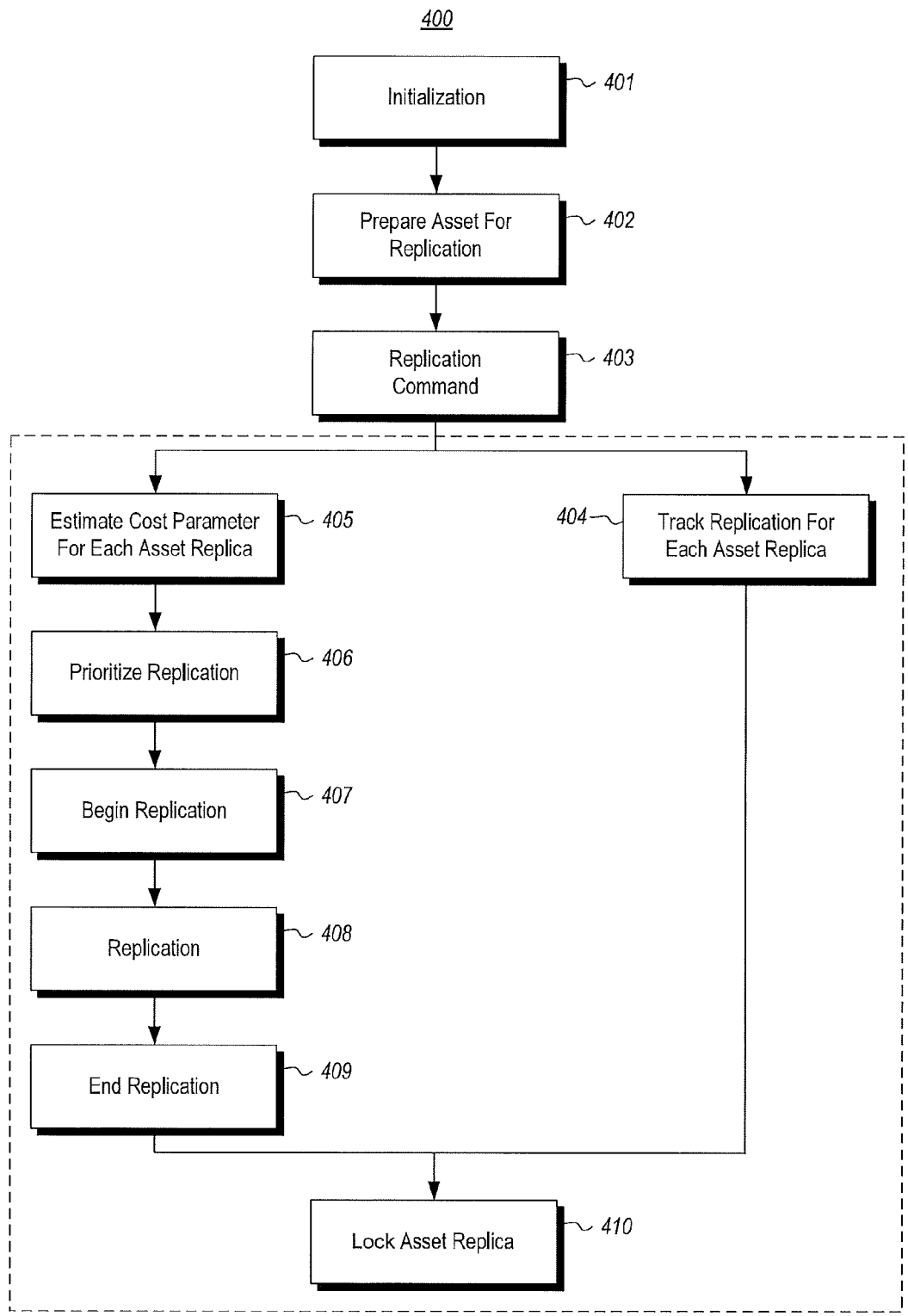
FIG. 4 illustrates a flowchart of a method for replicating an asset from a source cluster in a source data center to a multiple target clusters in multiple destination data centers.

FIG. 4 illustrates a flowchart of a method 400 for replicating an asset from a source cluster in a source data center to a multiple target clusters in multiple destination data centers. For instance, referring to the example of FIG. 3, suppose that an asset is to be replicated from the cluster 311A of the data center 301 to all of the remaining clusters in the environment 300. A cluster in which an asset that is to be replicated will often be referred to herein as a "source cluster", and the data center in which the source cluster is located will often be referred to herein as a "source data center". Likewise, a cluster to which an asset is to be replicated will often be referred to herein as a "target cluster", and the data center in which the target cluster is located will often be referred to herein as a "target data center".

The replication process is first initialized (act 401). The manner of initialization will depend on the specific implementation. However, in one embodiment, the storage cache is created in each target cluster, and then each of those target caches is registered. For instance, caches 321A, 321B, 322A, 322B, 323A, 323B, 324A, 324B, 325A and 325B are contained within clusters 311A, 311B, 312A, 312B, 313A, 313B, 314A, 314B, 315A and 315B. A "storage cache" is a storage account that is used as a cache to store a replica of the asset upon completion of replication to the corresponding target cluster. In one embodiment, a "storage account" is a highest level name space for accessing a storage service, which could be one of the services 212 in FIG. 2. For each target cache, the registration may occur manually or automatically.

Following initialization, however that occurs for the specific implementation of the replication system, the replication system is ready for replication. The asset to be replicated is then received into the source cluster (act 402). For instance, referring to FIG. 3, the source image 330 is provided into source cluster 311A. Additionally, so that the source image 330 itself does not need to be accessed many times, a single copy of the source image 330 is first made and placed into the source cache. For instance, this is represented in FIG. 3 using arrow 331 (labeled "1" to represent that this might be the first actual copy in the replication process).

Figure 5:
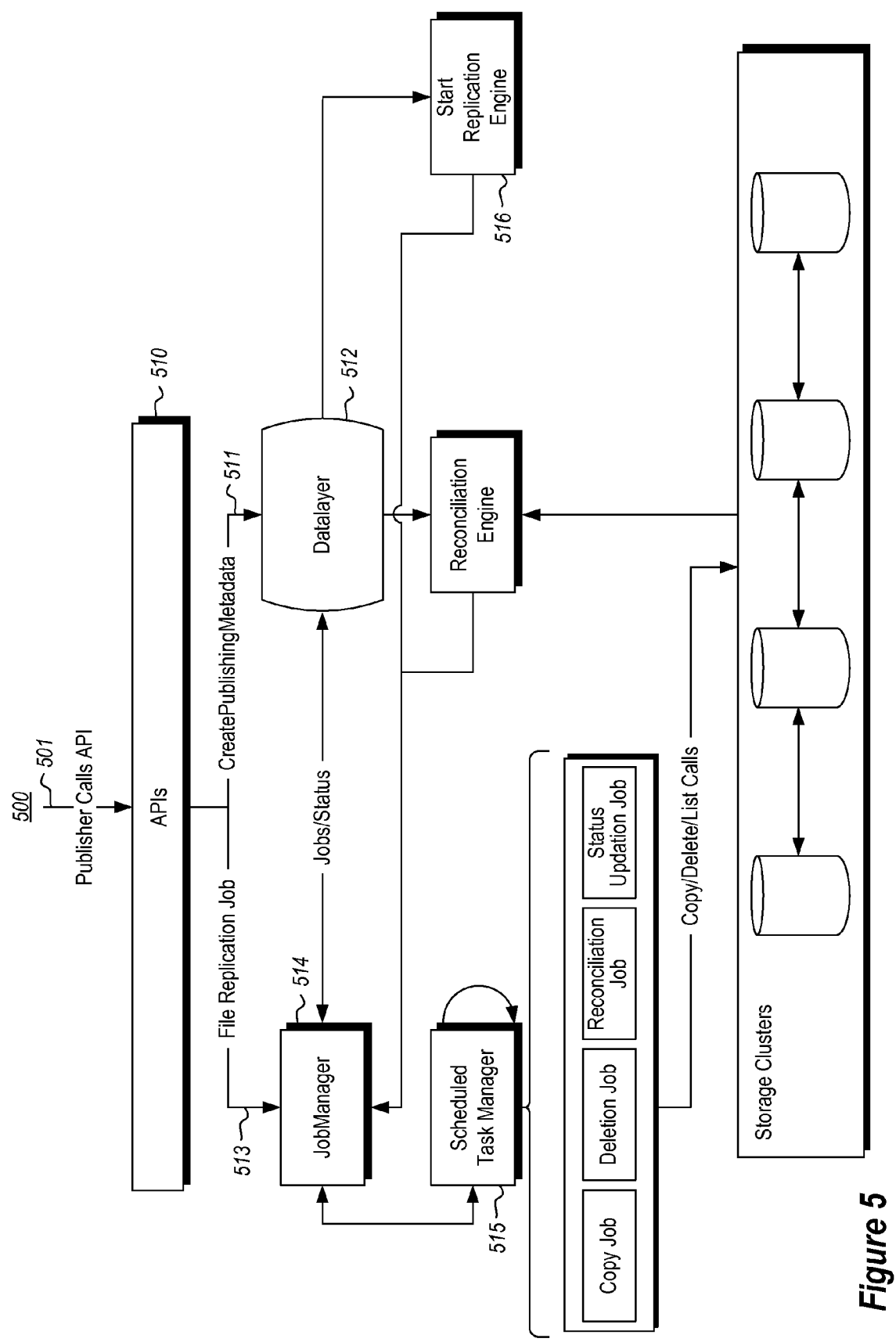
FIG. 5 schematically illustrates an architecture for performing the replication of an asset.

Once the system is initialized (act 401), and the source asset is properly positioned for replication (act 402), the command to replicate is detected (act 403). FIG. 5 illustrates a more specific embodiment of a replication system 500. Referring to FIG. 5, the publisher of the asset (i.e., the entity that initiates replication) calls an Application Program Interface (API) 510 as represented by arrow 501. The replication command may include sufficient information from which the target clusters can be properly identified. In the case of FIG. 3, and in the example continued throughout, the target clusters total nine target clusters and include target clusters 311B, 312A, 312B, 313A, 313B, 314A, 314B, 315A and 315B.

Figure 6:
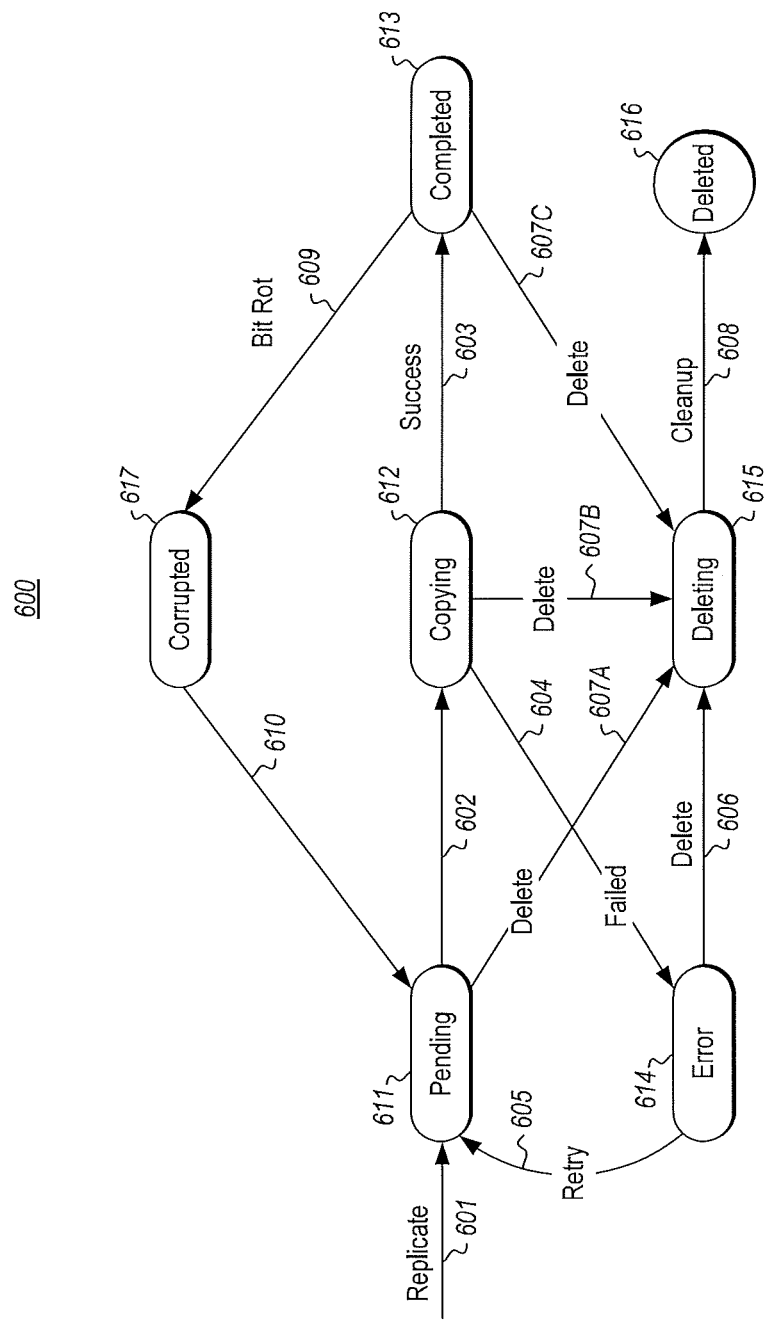
FIG. 6 illustrates a state diagram associated with replicating the asset.

The replication system then begins tracking a state of replication associated with each of the at least some of the target clusters (act 404). For instance, the replication system might create a metadata record for the asset replica for each target location. In FIG. 5, this is represented by the call CreatePublishingMetadata (reference arrow 511) to the data layer 512. FIG. 6 illustrates a state diagram 600 that represents how the data layer 512 might track the state of each asset replication. The replication command causes the metadata record for each asset replica to be set into the Pending state 611. The placing into this initial state with the creation of the metadata record is symbolized by arrow 601. Further transitions may happen in response to the functioning of the job manager 514 to be further described herein. For now, the state transition stays in the Pending state 611 awaiting the job manager 514 to trigger the replication of the corresponding asset replica.

Referring to FIG. 4, a cost parameter associated with copying of the asset from the source cluster to each of the target clusters is then estimated or determined (act 405). Referring to FIG. 5, this estimation or determination may be performed by the job manager 514 in response to receiving a command to perform the file replication as represented by arrow 513. The smart replication engine 516 may also assist with this estimation or determination. As an example, the cost parameter might be a geographic relationship between the source cluster and the target clusters. This example will be discussed in further detail below. However, other examples of cost parameters include a bandwidth of the channel between the source cluster and the target cluster, a utilization of the channel between the source cluster and the target cluster, and so forth. The order of replication is then prioritized based on the cost parameter(s) (act 406). Multiple cost parameters may be consulted in determining the prioritization, although in the example described in most detail herein, the geographical relationship between the source and target is the cost parameter. The replication is then begun based on the replication (act 407), and the replication continues (act 408), and completes (act 409) all while continuing to track the progress of the replication (act 404).

More details regarding the actual replication in one embodiment will now be described. For instance, the replication may occur in multiple phases. The job manager 514 queries the list of jobs, potentially caps the number of operations of a given type permitted during in phase, and then redirects the replication to the scheduled task manager 515. This results in a state transition 602 to the Copying state 612.

For instance, referring to FIG. 3, suppose that the number of copy operations is to be limited to three copy operations per phase. The first phase (represented by arrow 331) occurred just to prepare the asset into the source cache. The second phase involves three copy operations as represented by arrows 332A, 332B and 332C. In the embodiment of FIG. 3, at least one remote region is prioritized for copying of the asset within the initial replication phase. For instance, arrow 332A is a prioritized copy operation that allows an asset replica to at least be in Europe, from which that asset replica may be used in subsequent replication phases to more efficiently copy to various target caches in Europe.

Just behind making an asset replica available on each continent, the next level of prioritization is to make the asset available in each data center within a continent. Accordingly, cross data center copying represented by arrows 332B and 332C are also accomplished in this same phase. No further copying occurs in this phase as the cap on copying was reached for this phase.

In the beginning of the next phase of copying, there is now an asset replica available in each of the United States data centers 301, 302 and 303. Accordingly, an intra data center copy operation (also called herein a "fast copy" operation) is performed for each data center as represented by respective arrows 333A, 333B and 333C. In one embodiment, while the number of full copy operations might be capped, there might be a higher cap on the number of fast copy operations as fast copy operations are much more efficiently performed with fewer resource utilization. Accordingly, since there is less risk of system overutilization for a fast copy operation than a full copy operation, the fast copy operation may have a higher cap, or even no limit at all, for any given phase of replication. Also in this same phase, the cross data center copy (represented by arrow 333D) is performed in Europe.

In the final phase of replication, the intra data center copy operations in Europe are performed as represented by arrows 334A and 334B.

Referring to the state diagram 600 of FIG. 6, when each asset replica has been successfully replicated, the state transitions (as represented by arrow 603) to the Completed state 613.

Various failure scenarios will now be addressed. While the asset replica is in the Copying state, if the copy operation were to fail (as represented by arrow 604), the replication enters the Error state 614. Based on how many times the copy operation has failed, the state may then retry (as represented by arrow 605) the copy operation by placing the asset replica state back into the pending state 611, where it will be picked up in a subsequent replication phase. If a maximum number of retries has already been attempted, the state transitions (as represented by arrow 606) to the Deleting state 615).

The publisher might also issue a delete command, causing the asset replication to quit if in process, or causing the asset replica to be deleted if has already been copied. If the delete command is received while the copy operation is still pending, the state transitions (as represented by arrow 607A) from the Pending state 611 to the Deleting state 615. If the delete command is received while the copy operation is actively copying, the state transitions (as represented by arrow 607B) from the Copying state 612 to the Deleting state 615. If the delete command is received after the copy operation has already completed, the state transitions (as represented by arrow 607C) from the Completed state 613 to the Deleting state 615. Once in the Deleting state 615, appropriate cleanup is performed (as represented by arrow 618, resulting in the asset replica being deleted (equivalent to a Deleted state 616).

Referring back to FIG. 4, after replication occurs (e.g., when the asset replication enters the Completion state 613), the asset replica is locked (act 410). This prevents a write or delete operation from being performed on the asset replica. If that lock is broken, the asset replica is transitioned to a Corrupted state 617 following arrow 609. The asset replica is further deleted in the respective target cluster, and another copy operation is initiated. For instance, the state transitions from the Corrupted state 617 to the Pending state 611 as represented by arrow 610. The replication system will determine the closest asset replica to replicate from in performing the re-replication. In one embodiment, this reconciliation of asset replicas when is performed by a reconciliation engine, such as shown in FIG. 5.

Accordingly, an effective mechanism for prioritized replication of an asset across data centers is described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for replicating an asset from a source cluster in a source data center to a plurality of target clusters in a plurality of destination data centers, the method comprising:
   an act of at least estimating a cost parameter associated with copying of the asset from the source cluster to each of at least some of the target clusters;
   an act of prioritizing an order of replication based on the cost parameter; and
   an act of initiating the replication in accordance with the prioritization,
   wherein the replication occurs in a plurality of phases; and
   wherein a number of copy operations at least of a first type are limited to a first limit per replication phase, but a number of copy operations of a second type are not limited per replication phase.

2. The method in accordance with claim 1, wherein the cost parameter for at least one of the target clusters comprises a geographical relationship between the source cluster and the target cluster.

3. The method in accordance with claim 1, wherein a number of copy operations of a third type are limited to a second limit per replication phase.

4. The method in accordance with claim 1, wherein the cost parameter for at least one of the target clusters comprises a bandwidth of the channel between the source cluster and the target cluster.

5. The method in accordance with claim 1, wherein the cost parameter for at least one of the target clusters comprises a utilization of the channel between the source cluster and the target cluster.

6. The method in accordance with claim 1, wherein the asset is a virtual machine image.

7. The method in accordance with claim 1, wherein the asset is an application package.

8. The method in accordance with claim 1, further comprising:
   an act of tracking a state of replication associated with each of the at least some of the target clusters.

9. The method in accordance with claim 1, further comprising:
   an act of receiving the asset into the source cluster.

10. The method in accordance with claim 9, further comprising:
    an act of receiving a command to replicate, wherein the act of at least estimating and the act of prioritizing occurs in response to the command to replicate.

11. The method in accordance with claim 1, further comprising:
    an act of locking each replicated copy of the asset after replication so that writing to the replicated copy of the asset or deleting the replicated asset is prohibited.

12. The method of claim 11, wherein if a lock of the replicated copy of the asset on a particular target cluster is broken, the replicated copy of the asset in the particular target cluster is deleted, and marked for re-replication from another cluster that has a replicated copy of the asset.

13. A computer program product comprising one or more computer-readable hardware storage devices having thereon computer-executable instructions that are executable by one or more processors of a computing system for causing the computing system to replicate an asset from a source cluster in a source data center to a plurality of target clusters in a plurality of destination data centers by:
    at least estimating a cost parameter associated with copying of the asset from the source cluster to each of at least some of the target clusters;
    prioritizing an order of replication based on the cost parameter; and
    initiating the replication in accordance with the prioritization,
    wherein the replication occurs in a plurality of phases, with a number of copy operations at least of a first type being limited to a first limit per replication phase and with a number of copy operations of a second type being unlimited per replication phase.

14. A computing system comprising:
    one or more processors; and
    one or more hardware storage device having stored computer-executable instructions for instantiating a replication engine configured to perform replication of an asset from a source cluster in a source data center to a plurality of target clusters in a plurality of destination data centers by performing the following:
    an act of at least estimating a cost parameter associated with copying of the asset from the source cluster to each of at least some of the target clusters;
    an act of prioritizing an order of replication based on the cost parameter;
    an act of initiating the replication in accordance with the prioritization; and
    an act of locking a replicated copy of the asset after replication so that writing to the replicated copy of the asset or deleting the replicated copy of the asset is prohibited while the replicated copy is locked; and
    wherein if a lock of the locked replicated copy of the asset on a particular target cluster is broken, the replicated copy of the asset in the particular target cluster is deleted, and marked for re-replication from another cluster that has a replicated copy of the asset.

15. The computing system in accordance with claim 14, wherein the replication occurs in a plurality of phases.

16. The computing system in accordance with claim 15, wherein the prioritization of the order of replication occurs one replication phase at a time.

17. The computing system in accordance with claim 15, wherein the cost parameter for at least one of the target clusters comprises a geographical relationship between the source cluster and the target cluster, wherein at least one remotely located target cluster within a given remote region is prioritized for copying of the asset within an initial replication phase.

18. The computing system in accordance with claim 17, wherein the at least one remotely located target cluster is located on a different continent than the source cluster.

* * * * *